United States Patent
Brandt et al.

(10) Patent No.: US 6,317,178 B1
(45) Date of Patent: Nov. 13, 2001

(54) LIQUID CRYSTAL DISPLAY DEVICE HAVING ACTIVE & PASSIVE CELL WHEREIN A HEATER IS DISPOSED INSIDE THE PASSIVE CELL

(75) Inventors: Peter Brandt, Babenhausen; Dietmar Tippl, Kelkheim, both of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/564,373

(22) Filed: May 2, 2000

Related U.S. Application Data

(63) Continuation of application No. 09/185,489, filed on Oct. 3, 1998, now Pat. No. 6,128,053.

(30) Foreign Application Priority Data

Oct. 22, 1997 (DE) .............................................. 198 48 547
Nov. 7, 1997 (DE) .............................................. 197 49 215

(51) Int. Cl.[7] ........................ G02F 1/133; G02F 1/1347; G02F 1/1343
(52) U.S. Cl. ................................. 349/72; 349/33; 349/74; 349/147
(58) Field of Search ............................... 349/33, 72, 147, 349/74

(56) References Cited

U.S. PATENT DOCUMENTS

| | | | |
|---|---|---|---|
| 4,643,525 | 2/1987 | Haim | 350/331 R |
| 4,723,835 | * 2/1988 | Franklin | 350/331 R |
| 4,773,735 | 9/1988 | Ukrainsky et al. | 350/331 T |
| 4,987,289 | 1/1991 | Bishop et al. | 219/209 |
| 5,247,374 | 9/1993 | Terada | 359/44 |
| 5,274,484 | * 12/1993 | Mochizuki et al. | 349/33 |
| 5,559,614 | * 9/1996 | Urbish et al. | 349/21 |
| 5,838,413 | * 11/1998 | Matoba et al. | 349/155 |
| 5,886,763 | * 3/1999 | Wolkowicz et al. | 349/161 |

FOREIGN PATENT DOCUMENTS

| | | |
|---|---|---|
| 19505034 | 8/1996 | (DE) . |
| 2119554 | 11/1983 | (GB) . |
| 57-10119 | * 1/1982 | (JP) . |
| 2-55322 | * 2/1990 | (JP) . |
| 2000056286A | * 2/2000 | (JP) . |
| 9906885 | 2/1999 | (WO) . |

OTHER PUBLICATIONS

Patent Abstracts of Japan vol. 017, No. 062 (P–1483), Feb. 8, 1993 & JP 04271323, Sep. 28, 1992 Fuji Photo Film Co. Ltd.

* cited by examiner

*Primary Examiner*—William L. Sikes
*Assistant Examiner*—Tarifur R. Chowdhury
(74) *Attorney, Agent, or Firm*—Martin A. Farber

(57) ABSTRACT

A display device, in particular for a vehicle, has a viewing screen including a liquid crystal cell, the liquid crystal cell having a front cell wall and a rear cell wall and a liquid crystal substance arranged in the cell space between these cell walls, and with a heating device by means of which the display device can be heated. In order to ensure reliable operation of the display device even in the case of low temperatures, the heating device is arranged in the cell space of the liquid crystal cell directly or indirectly on the front cell wall and/or the rear cell wall.

20 Claims, 4 Drawing Sheets

LIQUID CRYSTAL DISPLAY DEVICE HAVING ACTIVE & PASSIVE CELL WHEREIN A HEATER IS DISPOSED INSIDE THE PASSIVE CELL

RELATED APPLICATION

This application is a continuation of our application Ser. No. 09/185,489 filed Oct. 3, 1998 now U.S. Pat. No. 6,128,053, the entire disclosure of which is considered as being part of the disclosure of this continuation application and is hereby incorporated by reference herein in its entirety.

FIELD AND BACKGROUND OF THE INVENTION

The invention relates to a display device, in particular for a vehicle, with a viewing screen having a liquid crystal cell, the liquid crystal cell having a front cell wall and a rear cell wall and a liquid crystal substance arranged in the cell space between these cell walls, and with a heating device by means of which the display device can be heated.

In liquid crystal cells, which are operated at least temporarily at low ambient temperatures, as is the case, for example, in displays in vehicles, the problem arises that at low temperatures the switching times of the liquid crystal cells become undesirably long, with the result that displays fitted therewith require a substantial inertia. It is known for the purpose of remedying this defect to provide a heating wire for a light box serving to illuminate a liquid crystal cell in a liquid crystal display. The liquid crystal cell is heated by means of the heating wire and held at a temperature level which renders it possible despite low ambient temperatures for the liquid crystal display to be operated with the required short switching times. Because of the relatively large spacing between the heating wire and liquid crystal cell, it is necessary for the heating wire to be supplied with a large amount of energy and to be strongly heated in order to be able to produce the required heating of the liquid crystal cell. Moreover, the heating wire undesirably heats the entire display unit because of its arrangement in the light box and of its necessarily high level of thermal radiation.

SUMMARY OF THE INVENTION

It is the object of the invention to configure a display device with a liquid crystal cell such that the display unit can be operated reliably and with only short switching times even in the case of low ambient temperatures.

This object is achieved according to the invention by virtue of the fact that the heating device is arranged in the cell space of the liquid crystal cell directly or indirectly on the front cell wall and/or the rear cell wall.

This design produces a direct and very quick heating of the liquid crystal substance without giving rise to undesired energy losses when relaying heat. The heat output generated by the heating device can therefore be particularly low. Undesired heating up of parts of the display device which are not to be heated is excluded. Moreover, the heating device can be fabricated simply along with the production of the liquid crystal cell without the need for additional assembly measures.

The heating-up and switching times of the display device are particularly short because of the direct assignment of the heating device to the liquid crystal substance and of the absence of a thermally insulating layer. Consequently, the display device according to the invention is also particularly suitable as a tachometer display in a motor vehicle. In a tachometer, short response times and an immediate ability to operate are particularly important, since the display of the traveling speed is of great significance for traffic safety.

The display unit is particularly simple and cost-effective in design when the liquid crystal cell is preferably a TN cell or an STN cell.

The production costs of the display unit can advantageously be lowered when the heating device has an electrically conducting layer. When current is applied, this layer can then function as a resistance heater. It is conceivable to arrange the electrically conducting layer immediately adjacent to the liquid crystal substance. However, it is particularly advantageous for the simple connection of the liquid crystals with as little outlay as possible in energy when the electrically conducting layer is arranged between a front electrode and/or a rear electrode of the liquid crystal cell and the front cell wall and/or rear cell wall.

The production of the liquid crystal cell is simplified still further when, in accordance with another advantageous development of the invention, the electrically conducting layer is arranged in a plane with a front electrode and/or a rear electrode of the liquid crystal cell. It is possible in this way for the electrically conducting layer to be applied in one operation with an electrode of the liquid crystal cell.

It is conceivable to configure the electrically conducting layer with a large area; however, the heating effect is particularly good when the electrically conducting layer extends in a meandering fashion. It is also conceivable to arrange the electrically conducting layer only in the regions in which switchable display elements are present. In this way, the use of electric energy required for heating can be further reduced owing to the avoidance of heating regions of the liquid crystal cell which are not switched and therefore also are not subject to any negative influence from low ambient temperatures.

Particularly in the case of point matrix displays having a liquid crystal cell, it is customary for the liquid crystal cell to have a front electrode and a rear electrode with in each case a set of mutually parallel electrode strips, the electrode strips of the front electrode and the rear electrode being arranged crosswise relative to one another. In order to achieve a good heating effect which covers an area in the case of such liquid crystal cells, it is particularly advantageous when the electrode, in the plane of which the electrically conducting layer is arranged, has the shape of a strip, and when elongated segments of the electrically conducting layer are arranged in interspaces of the strips.

In order to achieve a connection of the elongated segments of the electrically conducting layer which does not disturb the connection between the strip-shaped electrodes, plated-through holes connecting the plane of the front electrode and the plane of the rear electrode preferably electrically interconnect the elongated segments of the electrically conducting layer by means of connecting segments.

The electrodes of liquid crystal cells usually consist of indium tin oxide. The production of a display device according to the invention is therefore substantially simplified when the electrically conducting layer has indium tin oxide, with the result that there is no need for any additional material to be handled and processed in producing the liquid crystal cell.

In accordance with another advantageous development of the invention, the functional reliability of the display device is enhanced by virtue of the fact that the electrically conducting layer is covered with an electric insulating layer. The insulating layer advantageously has glass. This can, for example, be applied as glass powder and sintered on or sealed in.

In order to avoid damage to the liquid crystals of the liquid crystal substance, in accordance with an advantageous development of the invention, an AC voltage can be applied to the electrically conducting layer.

It is particularly advantageous, for transillumination of the viewing screen in particular, that the electrically conducting layer be optically transparent. In this way, light emitted by a light source serving the purpose of illumination is used in very large measure without there being appreciable light losses or nonuniform illumination of the viewing screen, as would be the case with the use of, for example, heating wires, which lead to the formation of shadows.

When, in accordance with an advantageous development of the invention, the front cell wall and/or the rear cell wall is a glass plate, it is rendered possible both for the viewing screen to be transilluminated (when both cell walls are glass plates) and for the liquid crystal cell to be produced simply and cost-effectively. Liquid crystal viewing screens can also be illuminated by ambient light and/or floodlighting falling on to it from the front side. This requires a reflector, which is arranged in the rear region or behind the liquid crystal cell, to deflect the incident light and render the driven regions of the liquid crystal cell visible to a viewer. It is therefore particularly advantageous when the heating device is optically reflective, with the result that it can take over the task of the abovenamed reflector.

In accordance with an advantageous development of the invention, the heating device is a transflector which reflects light impinging on the front side of the heating device and transmits light impinging on the rear side. It is thereby possible to read off the display unit without an additional light source, given a satisfactory ambient brightness, whereas given ambient darkness, a light source arranged behind the liquid crystal cell can be switched in to render the display visible.

It is particularly advantageous when the viewing screen has two liquid crystal cells arranged in series, as a result of which an undesired color effect of the liquid crystal cell can be compensated, It suffices for this purpose when one of the cells is actively driven and the other cell is only passively operated, the same liquid crystal substance being present in both cells. However, it is also conceivable to use two series-connected active cells, to make it possible to display mutually overlapping items of information.

The two liquid crystal cells are preferably TN cells or STN cells. The need for color compensation occurs in particular in the case of STN cells. Two STN cells arranged in series, one of the cells being operated actively and the other passively, are known under the name of a DSTN cell.

It is conceivable to provide a heating device in only one of the liquid crystal cells arranged in series. However, high heat output is then required to be able to heat the liquid crystal substance in both cells. Moreover, the liquid crystal substance more remote from the heating device will have a lower temperature level than the liquid crystal substance assigned directly to the heating device. Additional undesired color effects can occur because of the uneven heating of the two substances. It is therefore a particular advantage when each of the liquid crystal cells has a heating device.

It is conceivable to use the entire surface of the liquid crystal cell as display region for a display. However, in many instances only a subregion of the liquid crystal cell is provided as display region, and the other regions of the cell are covered by a stop. It is advantageous—in a fashion not disturbing the recognizability of the display—to arrange the heating device outside the display region of the liquid crystal cell.

In accordance with another advantageous development of the invention, a temperature sensor is arranged in the cell space of the liquid crystal cell. It is thereby easily possible to use an external electronic circuit to switch the heating device on and off as required in accordance with the temperature conditions in the liquid crystal cell.

In a DSTN cell having two liquid crystal cells arranged optically in series, one of the liquid crystal cells can be provided as active cell for making a display, and the other liquid crystal cell can be provided as passive cell for color compensation. In this case, it is particularly advantageous in accordance with another development of the invention when the viewing screen has a DSTN cell with an active liquid crystal cell and with a passive liquid crystal cell, the heating device being arranged in the passive liquid crystal cell. This ensures that the heating device does not exert any disturbing influences on the electric drive of the displaying liquid crystal cell.

It is advantageously the case that the passive liquid crystal cell has a front electrode and a rear electrode, and that it be possible to apply a voltage to the front electrode and the rear electrode in such a way that it is possible to display on the viewing screen either bright characters against a dark background (negative display) or dark characters against a bright background (positive display). It is therefore possible without additional outlay on hardware to select the more effectively readable display mode in each case—doing so as a function of the ambient brightness, for example.

The invention is explained in more detail below with the aid of exemplary embodiments represented in the attached drawing, in which:

DETAILED DESCRIPTION OF THE PREFERRED EMBODIMENTS

Figure 1:
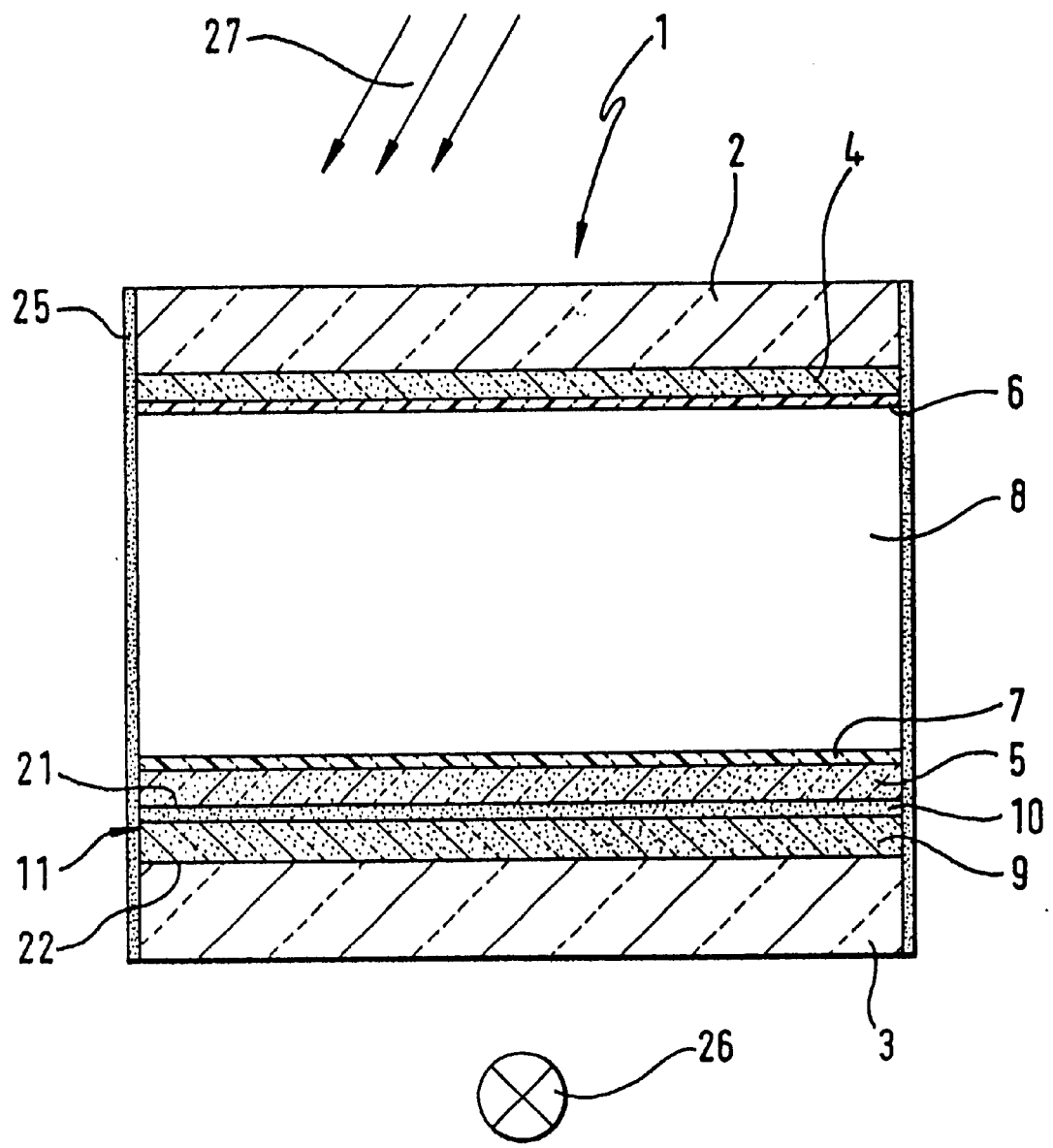
FIG. 1 shows a liquid crystal cell with a heating device, in a sectional view.

A liquid crystal cell 1 shown in FIG. 1, which can, for example, be a component of a point matrix viewing screen, has a front wall 2 and a rear wall 3. Both the front wall 2 and the rear wall 3 are formed by glass plates. Applied to the rear side of the front wall 2 is a front electrode 4, which is made from indium tin oxide, for example, and is covered by an electric insulating layer 6.

A heating device 11 is arranged directly on the front side of the rear wall 3 and thus on an inner wall of the liquid crystal cell 1. The heating device 11 comprises a heating layer 9 made from, for example, indium tin oxide, which is applied to the rear wall and is electrically insulated by means of an insulating layer 10 made from glass powder, for example. A rear electrode 5, which can likewise consist of indium tin oxide, is applied to the insulating layer 10 of the heating device 11 and sealed with an insulating layer 7.

A liquid crystal substance 8 is arranged between the front electrode 4 and the rear electrode 5—separated from the latter by the insulating layers 6, 7. The optical transparency of the liquid crystal substance 8 can be switched between individual segments of the front electrode 4 and the rear electrode 5. A bonding means 25 is used both to interconnect the front wall 2 and the rear wall 3 of the liquid crystal cell 1, and to secure the liquid crystal substance 8 inside the cell.

The liquid crystal cell 1 is illuminated by means of a light source 26 arranged behind the cell. For this purpose, the heating device 11 is transparent to light impinging on its rear side 22. Light beams, for example from ambient light 27, impinging on the front side 21 of the heating device 11, can be reflected at the front side 21 of the heating device 11, and thus contribute to rendering the switched regions of the liquid crystal substance 8 visible.

Figure 2:
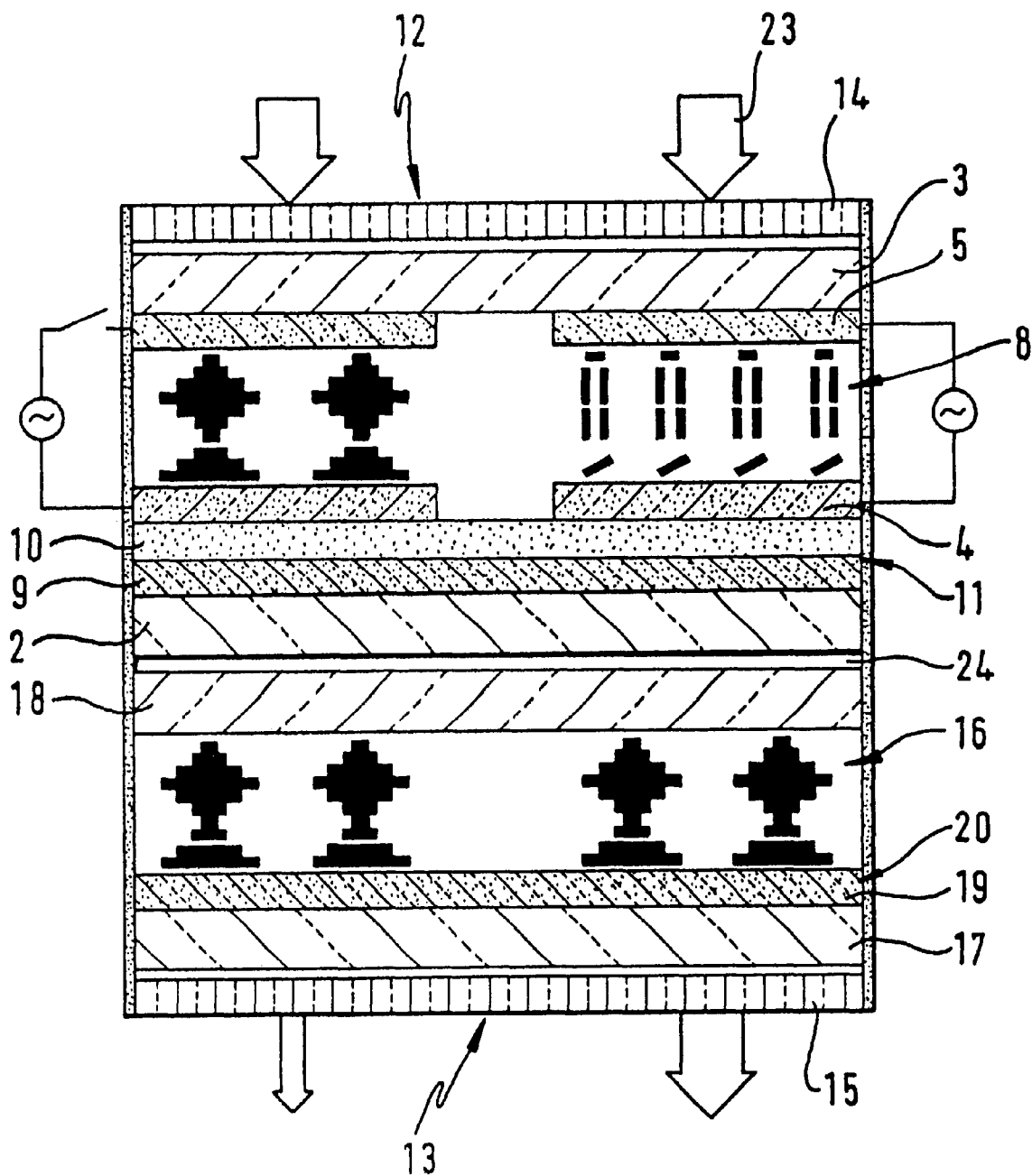
FIG. 2 shows a DSTN cell with heating devices, in a sectional view.

A DSTN cell comprising two liquid crystal cells 12 and 13 arranged in series is represented in FIG. 2. Identical components are provided here—as also in the following figures—with identical reference numerals in each case.

A polarizer 14 is arranged on the rear side of the liquid crystal cell 12, and a polarizer 15 is arranged on the front side of the liquid crystal cell 13. A front wall 2 and a rear wall 3 of the liquid crystal cell 12 are respectively formed by a glass plate, just like a front wall 17 and a rear wall 18 of the liquid crystal cell 13. A narrow air gap 24 is arranged between the walls 2 and 18.

The liquid crystal cell 13 is a passive cell which serves merely to compensate an undesired color effect. A liquid crystal substance 16 of the cell 13 is therefore illustrated diagrammatically in a non-driven state. The liquid crystal cell 12, by contrast, is an active cell. A liquid crystal substance 8 arranged between segments of a front electrode 4 and segments of a rear electrode 5 is illustrated in a driven state in the right-hand region of the display in FIG. 2, and this is made clear by the applied AC voltage, which is illustrated symbolically. Liquid crystal substance arranged in the left-hand region of the cell 12, by contrast, is present in a non-driven state.

Both the active liquid crystal cell 12 and the passive liquid crystal cell 13 are each provided with a heating device 11 and 20, respectively. The heating device 20 comprises a heating layer 19 applied to the front wall 17 of the cell 13. Since the cell 13 is not driven, there is no need for an additional electric insulating layer on the heating layer 19. By contrast, a heating layer 9 applied to the front wall 2 of the cell 12 is provided with an insulating layer 10, the result being to decouple the heating device 11 electrically from the front electrode 4.

The liquid crystal cells 12, 13 are illuminated by means of a transilluminating device which is symbolized by arrows 23, it being possible to learn from the arrows of equal width in the right-hand region of the representation of FIG. 2 that the driven cell region is optically transparent, whereas the non-driven cell region blocks the passage of light (compare different widths of arrows in the left-hand region of the representation of FIG. 2).

Figure 3:
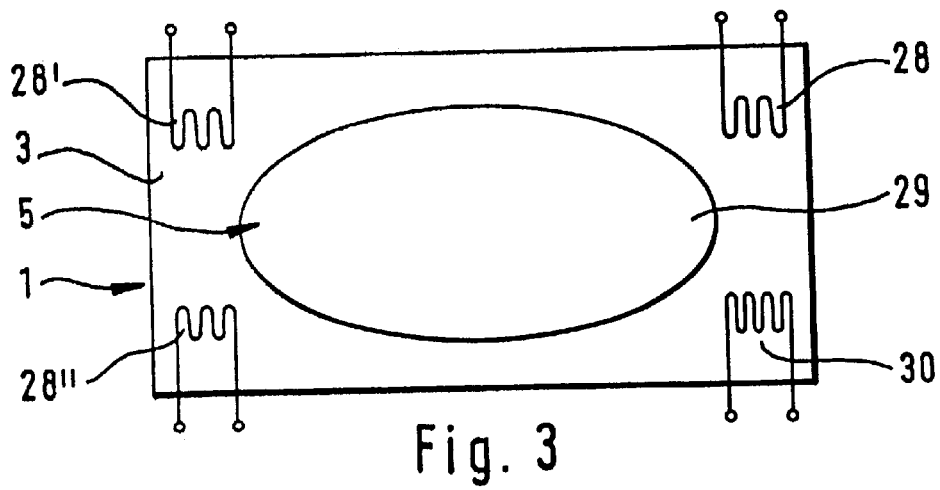
FIG. 3 shows a rear electrode of a further liquid crystal cell, in a front view.

Represented in FIG. 3 is a rear wall 3 with a rear electrode 5 of a liquid crystal cell 1 which is constructed to display information in an oval display region 29. Regions of the liquid crystal cell 1 lying outside the display region 29 are covered by a stop (not represented here). The liquid crystal cell 1 can be used, for example, to display the driving speed of a motor vehicle, and can be built into a dashboard or a combined instrument of the vehicle. Heating devices 28, 28', 28" are arranged in the same plane as the rear electrode 5 in three corner regions of the rectangular rear wall 3, which is formed by a glass plate. A temperature sensor 30 is arranged in the fourth corner region of the rear wall 3 in the plane of the heating devices 28, 28', 28" and the rear electrode 5. Via an external electric circuit (not represented here), the temperature sensor 30 switches the heating devices 28, 28', 28" on and off so that the cell interior of the liquid crystal cell 1 is held at an optimum operating temperature.

Figure 4:
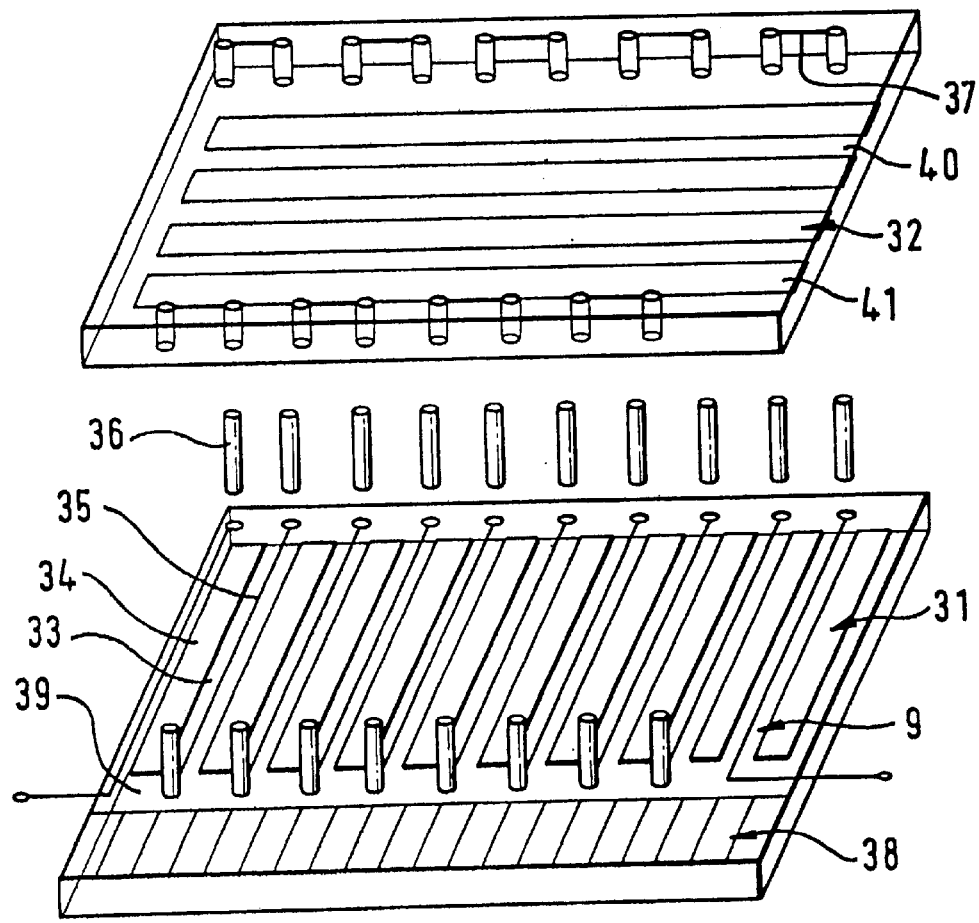
FIG. 4 shows a front wall and a rear wall of a further liquid crystal cell, in a perspective exploded view.

A front wall 39 and rear wall 40, formed in each case by glass plates, of a liquid crystal cell of a point matrix display is shown in FIG. 4. In addition to a front electrode 31 of strip-shaped construction, the front wall 39 has a terminal region 38 for making electric contact. Elongated segments 35 of a heating device 9 are arranged between strips 34 of the front electrode 31 in interspaces 33. Strips 41 of a rear electrode 32 are located on the rear wall 40 at right angles to the strips 34 of the front electrode 31. Continuous electric connection inside the heating device 9 is effected by plated-through holes 36 between the elongated segments 35 of the heating device 9 on the front wall 39 and connecting segments 37 on the rear wall 40.

Figure 5:
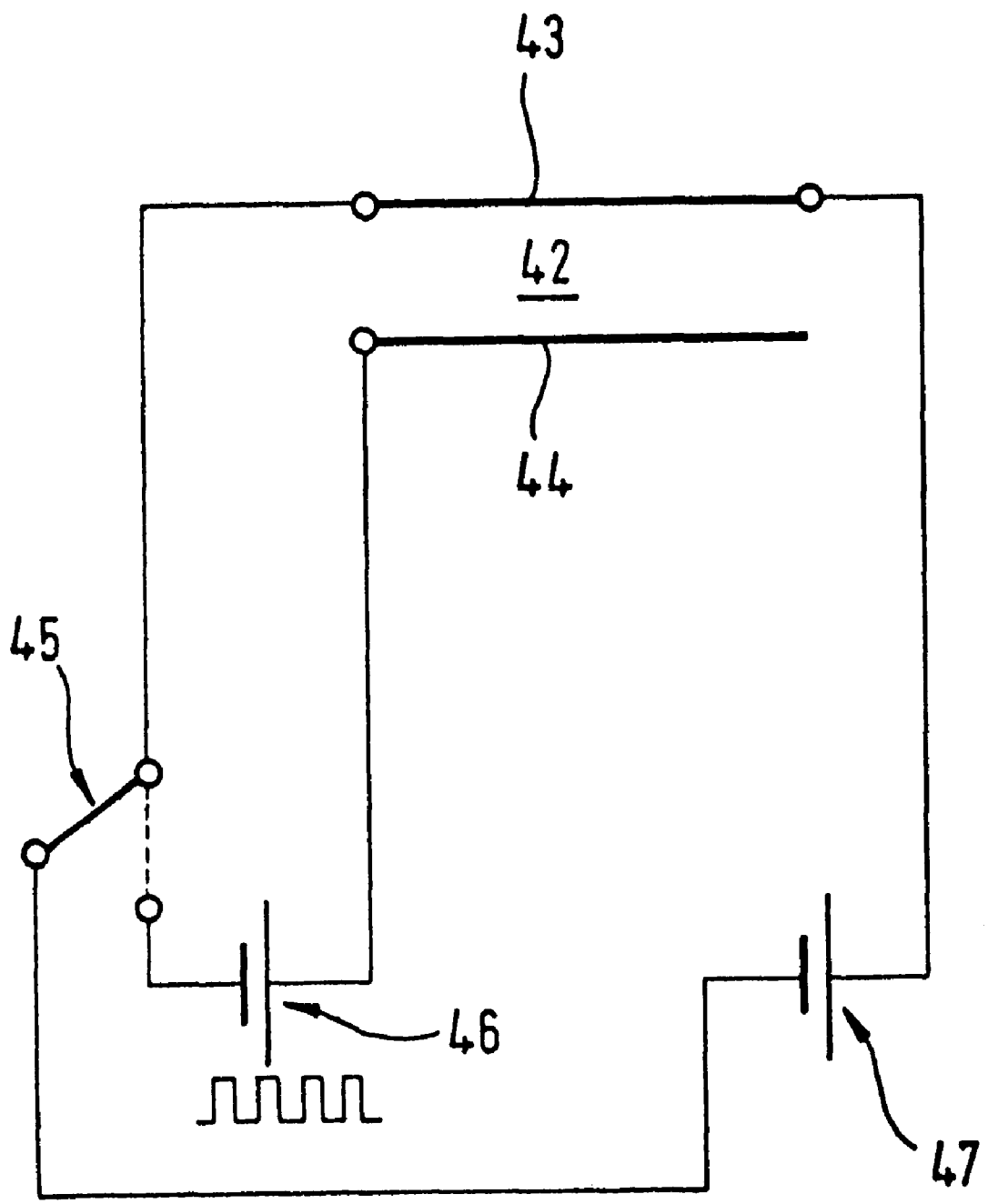
FIG. 5 shows a simplified circuit diagram for driving a liquid crystal cell.

Of a DSTN cell having an active liquid crystal cell for displaying information and a passive liquid crystal cell for the positive/negative changeover of a display device, FIG. 5 represents in a simplified fashion the passive liquid crystal cell 42 with a front electrode 43 and a rear electrode 44. It may be seen that it is possible via a power supply unit 46 to use a changeover switch 45 optionally to apply a driver voltage to the electrodes 43, 44 of the liquid crystal cell 42 (changeover switch 45 in the position represented by dashes), or to apply a heating voltage of a power supply unit 47 to the front electrode 43 (changeover switch 45 in the position represented by the continuous line). The driver voltage performs a positive/negative changeover of the DSTN cell; this changeover is possible only with the heating turned off. The heating device is formed in this exemplary embodiment by the front electrode 43.

What is claimed is:

1. A display device, suitable for use in a vehicle, the display device comprising:

a viewing screen having a first liquid crystal cell, the liquid crystal cell being an active cell including a front cell wall and a rear cell wall and a liquid crystal substance arranged in a cell space between these cell walls;

a second liquid crystal cell having cell walls enclosing a cell space, the second liquid crystal cell being disposed behind the first liquid crystal cell in a direction of viewing of the first liquid crystal cell, the second liquid crystal cell being a passive liquid crystal cell; and a heating device located in the second liquid crystal cell and serving to heat the display device, wherein the heating device is located in the cell space of the second liquid crystal cell at at least one of the cell walls;

wherein the first liquid crystal cell is a TN cell or an STN cell; and the heating device includes an electrically conductive layer of the display device for receiving a voltage applied thereto.

2. The display device as claimed in claim 1, wherein a heating of the second liquid crystal cell by the heating device is accomplished by an application of an AC voltage.

3. The display device as claimed in claim 1, wherein the heating device is operative by an application of an AC voltage to said electrically conducting layer.

4. The display device as claimed in claim 3, further comprising a front electrode of the first liquid crystal cell and a further heating device, wherein the further heating device has an electrically conducting layer which is located within the first liquid crystal cell and is arranged between the front electrode and the front cell wall.

5. The display device as claimed in claim 4, wherein the electrically conducting layer of the further heating device is completely covered with an electric insulating layer.

6. The display device as claimed in claim 5, wherein the electrically insulating layer comprises glass.

7. The display device as claimed in claim 4, wherein the electrically conducting layer is optically transparent; and an electrically insulating layer fully covers the electrically conductive layer in the heating device in only one of said liquid crystal cells, namely, in said active liquid crystal cell.

8. The display device as claimed in claim 3, further comprising a front electrode of the first liquid crystal cell and a further heating device within the first liquid crystal cell, wherein the further heating device has an electrically conducting layer which is arranged in a plane with the front electrode of the first liquid crystal cell.

9. The display device as claimed in claim 3, wherein the electrically conducting layer extends in a meandering fashion.

10. The display device as claimed in claim 3, wherein the electrically conducting layer comprises indium tin oxide.

11. The display device as claimed in claim 3, wherein the electrically conducting layer include means for receiving an AC voltage applied thereto.

12. The display device as claimed in claim 1, wherein at least one of the front cell wall and the rear cell wall of one of said liquid crystal cells comprises a glass plate.

13. The display device as claimed in claim 1, wherein the second liquid crystal cell is arranged in series with the first liquid crystal cell.

14. The display device as claimed in claim 13, wherein each of the two liquid crystal cells is a TN cell or STN cell.

15. The display device as claimed in claim 1, further comprising a temperature sensor arranged in a cell space of one of the liquid crystal cells.

16. The display device as claimed in claim 1, wherein the viewing screen comprises a DSTN cell formed of said first active liquid crystal cell and said second passive liquid crystal cell.

17. The display device as claimed in claim 16, wherein the passive liquid crystal cell has a front electrode and a rear electrode enabling reception of a voltage at the front electrode and at the rear electrode to display on the viewing screen either bright characters against a dark background or dark characters against a bright background.

18. A display device according to claim 1, wherein the heating device is located directly on a front cell wall of the second liquid crystal.

19. the display device, suitable for use in a vehicle, the display device comprising:

a viewing screen having a liquid crystal cell, the liquid crystal cell including a front cell wall and a rear cell wall and a liquid crystal substance arranged in a cell space between these cell walls; and a heating device serving to heat the display device, wherein the heating device is located in the cell space of the liquid crystal cell at at least one of the cell walls; and a first electrode and a second electrode located opposite to each other on opposite sides of said liquid crystal substance, said electrodes being segmented to provide for separately activatable portions of the viewing screen, and wherein said heating device comprises a series of electrically conductive segments extending across a plurality of said portions of the viewing screen between segments of the first electrode and segments of the second electrode; and wherein the display device further comprises plated through-holes providing electrical connection between conductive segments of said heating device on opposite sides of said liquid crystal substance.

20. A display device according to claim 19, wherein said first and said second electrodes are located between said front and said rear cell walls.

\* \* \* \* \*